(12) United States Patent
McCrary et al.

(10) Patent No.: US 8,453,816 B2
(45) Date of Patent: Jun. 4, 2013

(54) FLEXPLATE COUPLING FOR A WET CLUTCH TRANSMISSION

(75) Inventors: Paul T. McCrary, Belleville, MI (US); Thomas E. Braford, Brighton, MI (US)

(73) Assignee: BorgWarner Inc., Auburn Hills, MI (US)

( * ) Notice: Subject to any disclaimer, the term of this patent is extended or adjusted under 35 U.S.C. 154(b) by 616 days.

(21) Appl. No.: 12/440,485

(22) PCT Filed: Sep. 5, 2007

(86) PCT No.: PCT/US2007/077596
§ 371 (c)(1),
(2), (4) Date: Mar. 9, 2009

(87) PCT Pub. No.: WO2008/033701
PCT Pub. Date: Mar. 20, 2008

(65) Prior Publication Data
US 2010/0018824 A1    Jan. 28, 2010

Related U.S. Application Data

(60) Provisional application No. 60/844,963, filed on Sep. 15, 2006.

(51) Int. Cl.
*F16D 25/10* (2006.01)
*F16D 47/02* (2006.01)
*F16F 15/30* (2006.01)
*F16D 3/77* (2006.01)

(52) U.S. Cl.
USPC ............... 192/48.611; 192/55.61; 192/200; 464/98; 74/572.2

(58) Field of Classification Search
USPC .................. 192/55.3, 55.61, 200; 464/98
See application file for complete search history.

(56) References Cited

U.S. PATENT DOCUMENTS

| | | | |
|---|---|---|---|
| 5,788,037 A * | 8/1998 | Forsyth et al. | 192/70.12 |
| 6,026,940 A | 2/2000 | Sudau | |
| 6,039,651 A * | 3/2000 | Fukushima et al. | 464/98 |
| 6,666,313 B2 | 12/2003 | Gochenour et al. | |
| 2005/0082136 A1 * | 4/2005 | Braford et al. | 192/48.91 |
| 2005/0224308 A1 * | 10/2005 | Hauck et al. | 192/70.12 |
| 2006/0000684 A1 * | 1/2006 | Agner et al. | 192/48.8 |

FOREIGN PATENT DOCUMENTS

| | | |
|---|---|---|
| JP | 2000190748 A | 7/2000 |
| KR | 10-1998-0049863 A | 9/1998 |

OTHER PUBLICATIONS

PCT/US2007/077596 Written Opinion and Search Report (forms PCT/ISA/237, PCT/ISA/210); mailed Jan. 2, 2008; 9 pages.

* cited by examiner

*Primary Examiner* — Richard M. Lorence
(74) *Attorney, Agent, or Firm* — BrooksGroup

(57) ABSTRACT

A flexplate coupling is disclosed. The flexpate coupling may be used as part of a transmission. The flexplate coupling comprises a flywheel, a damper assembly including a hub portion, and a flexplate. The flexplate includes a hub fastened to the hub portion of the damper assembly and a peripheral portion fastened to the flywheel.

21 Claims, 2 Drawing Sheets

FLEXPLATE COUPLING FOR A WET CLUTCH TRANSMISSION

CROSS-REFERENCE TO RELATED APPLICATIONS

This application claims the benefit of U.S. Provisional Application No. 60/844,963, filed Sep. 15, 2006.

TECHNICAL FIELD

The field to which the disclosure generally relates includes mechanical connections between engines and transmissions.

BACKGROUND

Automotive powertrains may include splined mechanical connections between engines and transmissions.

SUMMARY OF EXEMPLARY EMBODIMENTS OF THE INVENTION

One embodiment includes a flexplate coupling for a wet clutch transmission.

Other exemplary embodiments of the present invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiments is merely exemplary in nature and is in no way intended to limit the invention, its application, or uses.

Figure 1:
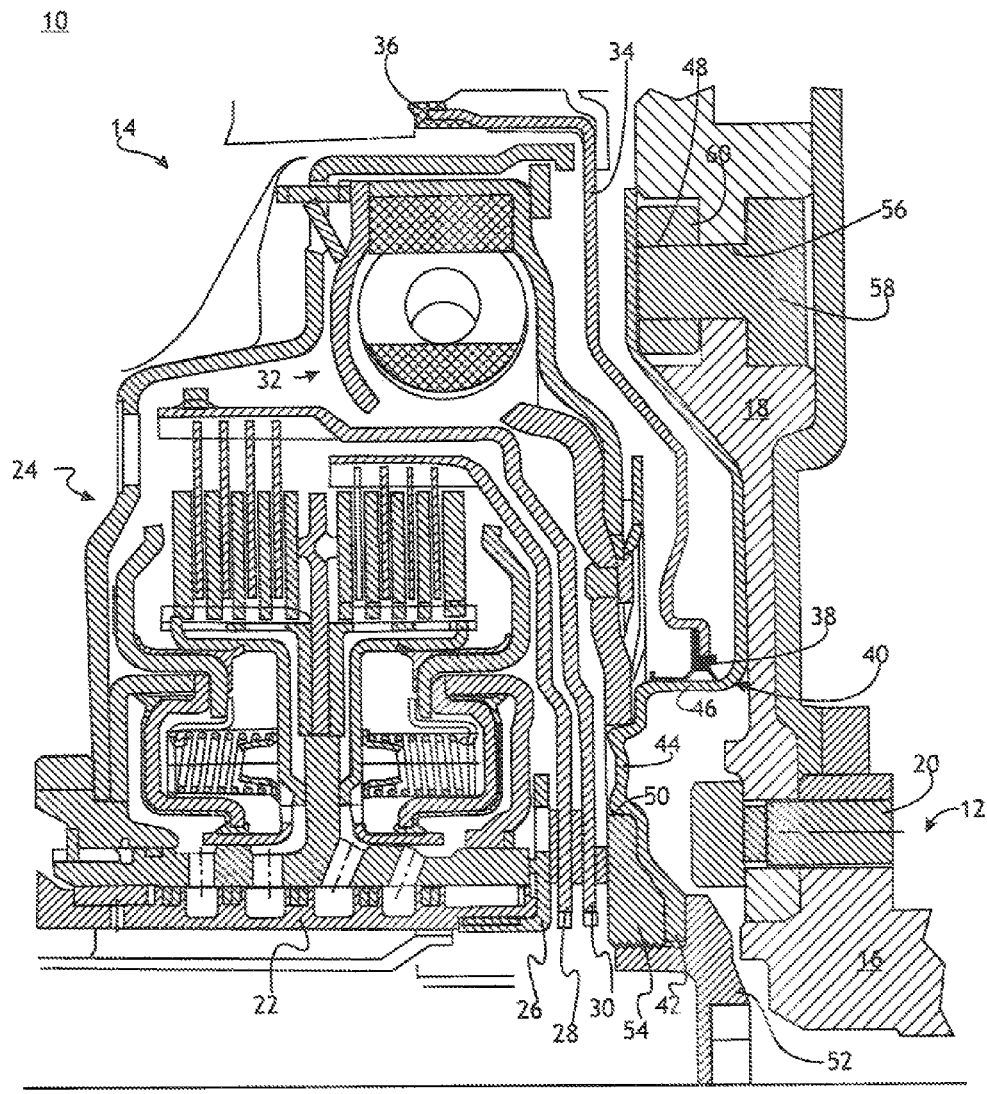
FIG. 1 illustrates one embodiment of the invention.

Referring now to FIG. 1, one embodiment of the invention may include an automotive powertrain 10 including an engine 12 (partially shown) coupled to a transmission 14 (partially shown) via a flexplate coupling as will be described in greater detail below.

The engine 12 may include a crankshaft 16, which may be connected to a flywheel 18 via one or more fasteners 20 such as bolts. The flywheel 18 may be assembled to the engine crankshaft 16 before the engine 12 and transmission 14 are coupled together.

The transmission 14 may be any suitable type of transmission such as a wet clutch or dual clutch transmission. The transmission 14 may include a center support 22 and a clutch assembly 24, which may be a dual clutch assembly as shown. The clutch assembly 24 may be assembled over the center support 22 and thereafter secured thereto with a clutch-to-support fastener 26, which may be threadingly engaged to a portion of the support 22. The transmission 14 may also include any other suitable components, such as clutch hubs 28, 30 and any suitable bearings or washers therebetween. The transmission 14 also may include a damper assembly 32 suitably coupled to the clutch assembly 24, such as substantially at the peripheries thereof as shown. Finally, the transmission 14 may also include an oil cover 34 that may be installed after the clutch and damper assemblies 24, 32 are installed. The oil cover 34 may include radially outer and inner seals 36, 38 to resist oil leakage out of the transmission 14.

The flexplate coupling may include at least portions of the flywheel 18 and damper assembly 32, and a flexplate 40 coupled therebetween. In general, the flexplate 40 may be coupled between the flywheel 18, which may be connected to the engine crankshaft, and the damper assembly 32, which may be installed in the transmission 14. The flexplate 40 may include a radial hub 42, one or more drive lugs 44 disposed radially outwardly of the radial hub 42, an axial seal hub 46 disposed radially outwardly of the drive lug(s) 44, and a peripheral portion 48 disposed radially outwardly of the axial seal hub 46. The flexplate 40 may be manufactured in any suitable manner, including stamping and other suitable processing.

The flexplate 40 may be assembled to the transmission 14 by axially aligning and sliding the axial seal hub 46 into the inner seal 38 of the oil cover 34. The flexplate 40 may be further assembled to the transmission 14 by circumferentially aligning and inserting the drive lugs 44 into corresponding drive holes 50 in the damper assembly 32. A clearance to slight interference fit may be provided between the drive lugs 44 of the flexplate 40 and the drive holes 50 in the damper assembly 32 to resist backlash. Also, the flexplate 40 may be secured to the damper assembly 32 using a fastener such as a nut 52 threaded internally to a hub portion 54 of the damper assembly 32 and trapping a portion of the flexplate radial hub 42 therebetween. The clamping force of the nut 52 may be supplemented using projections or serrations (not shown) in axial faces of the hubs 42, 54 of the damper assembly 32 and flexplate 40.

The flywheel 18 may be coupled to the flexplate 40 in any suitable manner. For example, any suitable fasteners may be used to connect the flywheel 18 to the flexplate 40. As shown in FIG. 1, the flywheel 18 may include one or more axial fastener passages 56 to accept one or more fasteners such as bolts 58 therethrough that may be threaded to one or more corresponding fasteners such as nuts 60. As shown, the fastener passages 56 may include any suitable reliefs, such as counterbores, to accept the bolts and nuts therein. The nuts 60 may be coupled to the peripheral portion 48 of the flexplate 40 in any suitable manner such as by welding, staking, integral forming, etc. Those skilled in the art will recognize that the bolts 58 and nuts 60 may be reversed, and that any other suitable connection may be provided between the flexplate 40 and flywheel 18.

Figure 2:
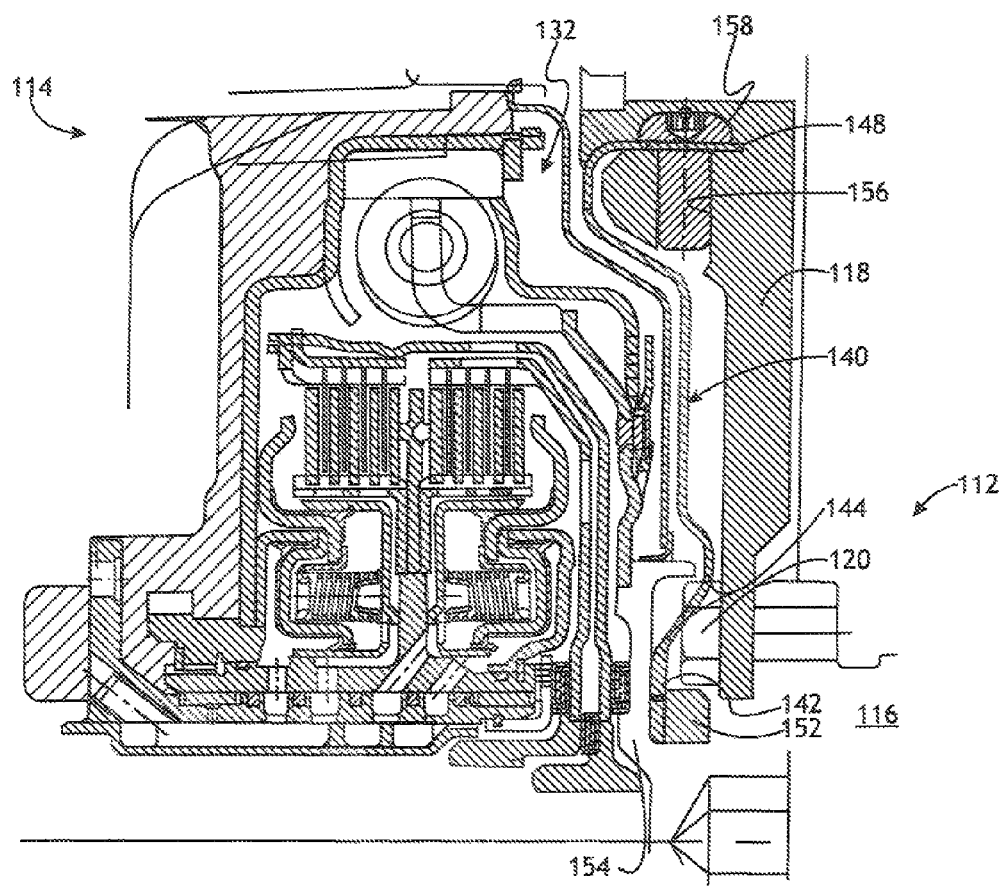
FIG. 2 illustrates another embodiment of the invention.

FIG. 2 illustrates another embodiment of the invention. This embodiment is similar in many respects to the embodiment of FIG. 1, and like numerals between the embodiments generally designate like or corresponding elements throughout the several views of the drawing figures. Additionally, the description of the previous embodiment is incorporated by reference and the common subject matter may generally not be repeated here.

In this embodiment, a powertrain 110 may include an engine 112 and a transmission 114 and a flexplate coupling therebetween that may include at least portions of a flywheel 118 and a damper assembly 132, and a flexplate 140 coupled therebetween. The flexplate 140 may include a radial hub 142, and an axial flange 148 disposed radially outwardly of the radial hub 142 and substantially at a peripheral portion of the flexplate 140. The flexplate 140 may also include reliefs 144 therein to accommodate fasteners 120 that may fasten the flywheel 118 to a crankshaft 116.

The flexplate 140 may be assembled to the transmission 114 by first mounting the radial hub 142 of the flexplate 140 against a hub portion 154 of the damper assembly 132. Then, the flexplate 140 may be restrained from rotation and the flexplate 140 secured to the damper assembly 132 in any suitable manner, such as using a fastener such as a nut 152 threaded externally to the hub portion 154 of the damper assembly 132 and trapping a portion of the flexplate radial hub 142 therebetween. As clearly shown in FIG. 2, the hub portion 154 may cooperate with an oil cover.

The flywheel 118 may be coupled to the flexplate 140 in any suitable manner. For example, any suitable fasteners may be used to connect the flywheel 118 to the flexplate 140. As shown in FIG. 2, the flywheel 118 may include one or more radial fastener passages 156 to accept one or more fasteners 158 such as screws or bolts therein. The fasteners 158 may extend through axial slots (not shown) in the axial flange 148 of the flexplate 140. The axial slots enable additional axial adjustment between the engine 112 and transmission 114, such as during assembly of the engine 112 to the transmission 114.

The above description of embodiments of the invention is merely exemplary in nature and, thus, variations thereof are not to be regarded as a departure from the spirit and scope of the invention.

What is claimed is:

1. A flexplate coupling comprising:
   a flywheel;
   a damper assembly including a hub portion; and
   a flexplate including a hub fastened to the hub portion of the damper assembly such that relative rotational and axial movement is prevented, and a peripheral portion fastened to the flywheel.

2. The flexplate coupling of claim 1 further comprising a plurality of reliefs in the flex plate adapted to accommodate fasteners for the flywheel.

3. A flexplate coupling comprising:
   a flywheel;
   a damper assembly including a hub portion; and
   a flexplate including a hub fastened to the hub portion of the damper assembly, and a peripheral portion fastened to the flywheel further comprising a nut coupled to the hub portion of the damper assembly and trapping at least a portion of the hub of the flexplate between the nut and the hub portion of the damper assembly.

4. The flexplate coupling of claim 2 wherein the flexplate further includes a plurality of fasteners coupled to the peripheral portion and to the flywheel.

5. A flexplate coupling comprising:
   a flywheel;
   a damper assembly including a hub portion; and
   a flexplate including a hub fastened to the hub portion of the damper assembly, and a peripheral portion fastened to the flywheel wherein the damper assembly also includes a plurality of holes, and wherein the flexplate also includes a plurality of drive lugs disposed radially outwardly of the hub and inserted in the holes of the damper assembly to couple the flexplate to the damper assembly.

6. A flexplate coupling comprising:
   a flywheel;
   a damper assembly including a hub portion; and
   a flexplate including a hub fastened to the hub portion of the damper assembly, and a peripheral portion fastened to the flywheel wherein the flexplate further includes an axial flange disposed radially outwardly of the hub substantially at the peripheral portion of the flexplate and coupled to the flywheel.

7. A powertrain comprising:
   a transmission with a damper assembly;
   a flywheel;
   a flexplate for coupling between the flywheel and the damper assembly, the flexplate comprising:
   a hub;
   a plurality of drive lugs disposed radially outwardly of the hub and adapted to be coupled to the damper assembly; and
   a peripheral portion disposed radially outwardly of the drive lugs.

8. The powertrain of claim 7 wherein the flexplate further comprising:
   a plurality of fasteners coupled to the peripheral portion and adapted to be coupled to the flywheel.

9. The powertrain of claim 7 wherein the flexplate further comprising an axial seal hub disposed radially outwardly of the drive lugs and adapted to cooperate with an oil cover of the transmission.

10. The powertrain of claim 7 wherein the flexplate hub is adapted to be fastened to the damper assembly.

11. A powertrain comprising:
    a flywheel of an engine;
    a damper assembly of a transmission;
    a flexplate for coupling between the flywheel of an engine and the damper assembly of a transmission, the flexplate comprising:
    a hub adapted to be fastened to the damper assembly;
    an axial flange disposed radially outwardly of the hub substantially at a peripheral portion of the flexplate and adapted to be fastened to the flywheel.

12. The powertrain of claim 11 wherein the flexplate further comprising a plurality of reliefs therein adapted to accommodate fasteners for the flywheel.

13. A powertrain comprising:
    an engine having a crankshaft coupled to a flywheel;
    a wet clutch transmission having a dual clutch assembly coupled to a damper assembly; and
    a flexplate coupled between the flywheel and the damper assembly wherein the damper assembly includes a hub portion, and wherein the flexplate includes a hub secured to the hub portion of the damper assembly such that relative rotational and axial movement is evented and a peripheral portion coupled to the flywheel.

14. A powertrain comprising:
    an engine having a crankshaft coupled to a flywheel;
    a wet clutch transmission having a dual clutch assembly coupled to a damper assembly; wherein the damper assembly includes a hub portion, and
    a flexplate coupled between the flywheel and the damper assembly further comprising a nut fastened to the hub portion of the damper assembly and trapping at least a portion of the hub of the flexplate between the nut and the hub portion of the damper assembly;
    and wherein the flexplate includes a peripheral portion coupled to the flywheel.

15. The powertrain of claim 14 wherein the flexplate further includes a plurality of fasteners coupled to the peripheral portion and coupled to the flywheel.

16. The powertrain of claim 14 further comprising an oil cover disposed between the damper assembly and the flexplate and including an oil seal.

17. The powertrain of claim 16 wherein the hub portion of the damper assembly is in cooperation with the oil seal of the oil cover.

18. The powertrain of claim 16 wherein the flexplate includes an axial seal hub in cooperation with the oil seal of the oil cover.

19. The powertrain of claim 14 further comprising a plurality of reliefs in the flex plate adapted to accommodate fasteners used to fasten the flywheel to the crankshaft.

20. A powertrain comprising:
   an engine having a crankshaft coupled to a flywheel;
   a wet clutch transmission having a dual clutch assembly coupled to a damper assembly; and
   a flexplate coupled between the flywheel and the damper assembly wherein the damper assembly includes a hub portion, and wherein the flexplate includes a hub secured to the hub portion of the damper assembly and a peripheral portion coupled to the flywheel wherein the damper assembly further includes a plurality of holes, and wherein the flexplate further includes a plurality of drive lugs disposed radially outwardly of the hub and inserted in the holes of the damper assembly to couple the flexplate to the damper assembly.

21. A powertrain comprising:
   an engine having a crankshaft coupled to a flywheel;
   a wet clutch transmission having a dual clutch assembly coupled to a damper assembly; and
   a flexplate coupled between the flywheel and the damper assembly wherein the damper assembly includes a hub portion, and wherein the flexplate includes a hub secured to the hub portion of the damper assembly and a peripheral portion coupled to the flywheel wherein the flexplate further includes an axial flange disposed radially outwardly of the hub substantially at the peripheral portion of the flexplate and fastened to the flywheel.

\* \* \* \* \*